(12) United States Patent
Tiemeyer et al.

(10) Patent No.: US 12,650,687 B2
(45) Date of Patent: Jun. 9, 2026

(54) FLOW CONTROL ASSEMBLY HAVING LOCALIZED NON- VOLATILE MEMORY

(71) Applicant: IDEX Health & Science LLC, Rohnert Park, CA (US)

(72) Inventors: Tim Tiemeyer, Middleboro, MA (US); John Ruf, Rohnert Park, CA (US); Michael Brew, San Rafael, CA (US)

(73) Assignee: IDEX Health & Science LLC, Rohnert Park, CA (US)

( * ) Notice: Subject to any disclaimer, the term of this patent is extended or adjusted under 35 U.S.C. 154(b) by 845 days.

(21) Appl. No.: 17/951,215

(22) Filed: Sep. 23, 2022

(65) Prior Publication Data

US 2023/0022667 A1     Jan. 26, 2023

Related U.S. Application Data

(63) Continuation of application No. 16/611,950, filed as application No. PCT/US2018/028851 on Apr. 23, 2018, now Pat. No. 11,454,962.

(Continued)

(51) Int. Cl.
　　*G05B 23/02*　　　(2006.01)
　　*F16K 31/04*　　　(2006.01)
　　(Continued)

(52) U.S. Cl.
　　CPC .......... *G05B 23/0283* (2013.01); *F16K 31/04* (2013.01); *F16K 37/0041* (2013.01);
　　(Continued)

(58) Field of Classification Search
　　CPC ................ F16K 31/04; F16K 37/0041; G01N 2030/027; G01N 2030/201; G01N 30/20;
　　(Continued)

(56) References Cited

U.S. PATENT DOCUMENTS

| 4,422,942 A | 12/1983 | Allington |
| 5,425,270 A | 6/1995 | McDonald et al. |

(Continued)

FOREIGN PATENT DOCUMENTS

| DE | 10254219 | 6/2004 |
| DE | 102012107377 | 2/2014 |

(Continued)

OTHER PUBLICATIONS

Office Action in Japanese Patent Application No. 2019-560645 dated Sep. 28, 2022.

(Continued)

*Primary Examiner* — David L Singer
(74) *Attorney, Agent, or Firm* — Billion & Armitage

(57) ABSTRACT

An apparatus for controlling fluid flow and in particular fluid flow through a microfluidic multi-port control valve assembly of a High Pressure Liquid Chromatography (HPLC) unit. The flow control apparatus has a localized data repository for storing local valve position data and cumulative wear indications of components of the apparatus. The stored information travels with the apparatus allowing for more reliable predictive failure of components of the apparatus and translation of local valve position data for compatibility with host valve information. The translated valve position data enables determination of whether valve motion is acceptable and complete.

16 Claims, 16 Drawing Sheets

Related U.S. Application Data

(60) Provisional application No. 62/502,853, filed on May 8, 2017.

(51) Int. Cl.

| | |
|---|---|
| *F16K 37/00* | (2006.01) |
| *G01N 30/02* | (2006.01) |
| *G01N 30/20* | (2006.01) |
| *G01N 30/22* | (2006.01) |
| *G01N 30/86* | (2006.01) |
| *G05B 21/02* | (2006.01) |

(52) U.S. Cl.

CPC ..... *G01N 30/8655* (2013.01); *G01N 30/8665* (2013.01); *G05B 21/02* (2013.01); *G01N 2030/027* (2013.01); *G01N 30/20* (2013.01); *G01N 2030/201* (2013.01); *G01N 30/22* (2013.01); *G05B 2219/25312* (2013.01)

(58) Field of Classification Search

CPC ............... G01N 30/22; G01N 30/8655; G01N 30/8665; G05B 21/02; G05B 2219/25312; G05B 23/0283

See application file for complete search history.

(56) References Cited

U.S. PATENT DOCUMENTS

| | | | |
|---|---|---|---|
| 5,573,032 | A | 11/1996 | Lenz et al. |
| 5,892,458 | A | 4/1999 | Anderer et al. |
| 6,167,965 | B1 | 1/2001 | Bearden et al. |
| 6,571,180 | B1 | 5/2003 | Turner et al. |
| 6,745,084 | B2 | 6/2004 | Boger et al. |
| 6,782,344 | B2 | 8/2004 | Ito et al. |
| 7,089,086 | B2 | 8/2006 | Schoonover |
| 7,201,185 | B2 | 4/2007 | Poppe et al. |
| 7,240,833 | B2 | 7/2007 | Zarembo |
| 8,036,760 | B2 | 10/2011 | Mehta et al. |
| 8,261,773 | B2 | 9/2012 | Tower |
| 8,414,773 | B2 | 4/2013 | Davison et al. |
| 8,622,086 | B2 | 1/2014 | Servin |
| 8,666,556 | B2 | 3/2014 | Agahi |
| 8,914,135 | B2 | 12/2014 | Daraiseh et al. |
| 9,027,384 | B2 | 5/2015 | Rhodes et al. |
| 9,086,371 | B2 | 7/2015 | Clemens et al. |
| 9,594,998 | B2 | 3/2017 | Butler et al. |
| 9,680,348 | B2 | 6/2017 | Rodger et al. |
| 9,700,672 | B2 | 7/2017 | Capone et al. |
| 9,752,859 | B2 | 9/2017 | Labat et al. |
| 9,829,451 | B2 | 11/2017 | Gray et al. |
| 2003/0192595 | A1 | 10/2003 | Benson |
| 2007/0185659 | A1 | 8/2007 | Love |
| 2008/0163937 | A1 | 7/2008 | Esposito |
| 2008/0183310 | A1 | 7/2008 | Dykstra |
| 2009/0133573 | A1* | 5/2009 | Kleegrewe .......... F16K 37/0083 91/358 R |
| 2011/0005304 | A1 | 1/2011 | Vorm |
| 2011/0024657 | A1 | 2/2011 | Tower |
| 2011/0144813 | A1 | 6/2011 | Agahi |
| 2013/0018514 | A1 | 1/2013 | Addala et al. |
| 2013/0134334 | A1 | 5/2013 | Denat |
| 2013/0153035 | A1 | 6/2013 | Young |
| 2013/0153062 | A1 | 6/2013 | Young |
| 2013/0153798 | A1 | 6/2013 | Kucera |
| 2013/0154841 | A1 | 6/2013 | Kucera |
| 2014/0261791 | A1 | 9/2014 | Grabau |
| 2014/0305525 | A1 | 10/2014 | Le Moing |
| 2015/0045971 | A1 | 2/2015 | Endel |
| 2015/0088434 | A1 | 3/2015 | Grabau |
| 2015/0129666 | A1 | 5/2015 | Butler |
| 2015/0149100 | A1 | 5/2015 | Eisenbeis |
| 2015/0176721 | A1 | 6/2015 | Schoonover |
| 2015/0198255 | A1 | 7/2015 | Gamache |
| 2016/0041565 | A1 | 2/2016 | Edwards |
| 2016/0377184 | A1 | 12/2016 | Hara et al. |
| 2017/0204990 | A1 | 7/2017 | Kucera |
| 2017/0293293 | A1 | 10/2017 | Brownie et al. |
| 2017/0369190 | A1 | 12/2017 | Ethington et al. |
| 2018/0080649 | A1 | 3/2018 | Kucera et al. |
| 2018/0094737 | A1 | 4/2018 | Clement et al. |
| 2018/0094746 | A1 | 4/2018 | Zhang |
| 2018/0094951 | A1 | 4/2018 | Tima et al. |
| 2018/0142806 | A1 | 5/2018 | Mueller |

FOREIGN PATENT DOCUMENTS

| | | |
|---|---|---|
| EP | 2604923 | 6/2013 |
| JP | 2000249694 | 9/2000 |
| JP | 2012241578 | 12/2012 |
| JP | 2013500452 | 1/2013 |
| JP | 2015152033 | 8/2015 |
| JP | 2016517521 | 6/2016 |
| KR | 20040076194 | 8/2004 |
| WO | 2012058515 | 5/2012 |
| WO | 2016139376 | 9/2016 |
| WO | 2017196702 | 11/2017 |

OTHER PUBLICATIONS

Search Report and Written Opinion in International Application No. PCT/US2018/28851 dated Jul. 9, 2018.

Office Action in Japanese Patent Application No. 2019-560645 dated Feb. 4, 2022.

Symmetry Electronics, 3 Key Advantage of Ferroelectric RAM (FRAM) in Product Design (Year: 2014).

Jameson et al., Fault Diagnostic Opportunities for Solenoid Operated Valves using Physics-of-Failure Analysis, 2014 International Conference on Prognostics and Health Management (Year: 2014).

\* cited by examiner

FLOW CONTROL ASSEMBLY HAVING LOCALIZED NON- VOLATILE MEMORY

CROSS-REFERENCE TO RELATED APPLICATIONS

This application is a continuation of U.S. patent application Ser. No. 16/611,950, filed on Nov. 8, 2019 as the national phase of International Application Serial No. PCT/US2018/028851, filed on Apr. 23, 2018, which itself claims the filing benefit and priority of U.S. Provisional Patent Application Ser. No. 62/502,853 filed May 8, 2017, the contents of which are incorporated herein by reference in their entirety.

FEDERAL SPONSORSHIP

Not Applicable

JOINT RESEARCH AGREEMENT

Not Applicable

TECHNICAL FIELD

The present invention relates generally to fluid flow control assemblies and, more particularly, to a microfluidic multi-port control valve assembly of a High Pressure Liquid Chromatography (HPLC) unit having a localized data repository for storing identifying data corresponding to the valve control assembly. In some embodiments, the stored data corresponds to a last known valve position, thereby eliminating the need to re-initialize the valve after each power shutdown. The localized data repository travels with the valve regardless the environment in which it is used. Further, in some embodiments the identifying data stored in the localized data repository may include data corresponding to cumulative use and wear characteristics for predictive failure of components of the microfluidic multi-port control valve assembly. The invention further relates to a method of evaluating a flow control apparatus and, more specifically, evaluating a microfluidic multi-port control valve assembly of a High Performance Liquid Chromatography (HPLC) unit having a localized cumulative wear indicator for predictive failure of components of the assembly.

BACKGROUND

In the past, High Pressure Liquid Chromatography (HPLC) units have utilized several pumps and valves to control the flow of a sample fluid through the HPLC unit. A host computer system is typically electrically coupled to the HPLC unit and to various components within the HPLC unit including microprocessor controlled pumps and valves. The host system may control the components within the HPLC and store information related to the control of the components. Various components within the HPLC unit exhibit wear characteristics at different rates. An HPLC pump, for example, may require repair or replacement at a different rate than an HPLC control valve operating in the same HPLC unit. Further, at times, it is desirable to repair or replace only portions of the pump or valve rather than replacing the entire component.

Although the host computer may record in memory data related to repair and replacement events associated with a serialized component, at times, various components from one HPLC unit are swapped out and placed into a different unit. Unless the two host computers are tethered, the second host computer has no history of the swapped components and must re-initialize all swapped components. Additionally, although current flow control components may have tags or labels attached to an exterior of the component, the indicia included on the label is limited and static. Further, when the second host computer does not have a use history for these components it is possible for the user of the HPLC to be unaware that the HPLC unit has one or more components that may, for example, be nearing end of life or in need of maintenance.

It would be desirable, therefore, to provide a flow control component, which may be suitable for use in an HPLC unit, capable of storing in local non-volatile memory updated information and data associated with the component. For example, without limitation intended, it would be desirable to store in local memory of the component information related to repair status of the component, orientation of subcomponents of the component, orientation of a component within its environment, component serial number, sub-component part numbers, component manufacturer, date of manufacture, component configuration, lifetime/usage, operating specifications, material compatibility, values associated with component movement, values associated with cumulative amounts of component motion, last known position of components, optimal position of components, component errors, component repair information, component maintenance requirements, or information related to environments of which the component is exposed.

SUMMARY

Embodiments according to aspects of the invention include a flow control component that has one or more localized data repositories for storing a variety of information related to use of the component. The data repository includes non-volatile memory that is preferably, without limitation intended, of the FRAM variety. In certain embodiments the flow control component may be a direct drive flow control valve having a motor, drive train, and fluid path assembly contained as a single unit. A printed circuit board (PCB) and motor driver may be mounted to the direct drive valve. The fluid path assembly of the valve may include a cover or stator and a diaphragm or rotor with ports formed therein. The diaphragm may be rotated by the motor to control the desired flow of fluids through the valve. At times the fluid path assembly may be repaired or replaced by replacing only the rotor and stator components. A record of the rebuild of the fluid path assembly may be stored in the data repository. Further, the amount of rotation of the diaphragm or rotor may be determined and a record of the amount of rotation may be stored in the data repository. Also, a cumulative or total amount of rotor motion and motor motion may also be recorded in the data repository. When the fluid path assembly is rebuilt, the cumulative amount of rotation for each rotor may be stored separately in the data repository. In this manner, information is retained corresponding to each rebuild throughout the life of the overall "single unit." Data associated with the total movement or rotations of the drive train and motor may also be retained and stored as separate values distinct from the rotations of the rotor.

In certain embodiments the flow control component may comprise a flow control valve assembly having a motor, actuator, and modular pod. The valve or diaphragm is contained within the pod. One or more PCB's may be mounted to the valve assembly. By way of example, a PCB may be mounted to both the actuator and the motor. Drive controllers, a microprocessor and resident nonvolatile memory may be mounted to the PCB. A fluid path assembly is contained within the pod and the fluid path assembly may be "serviced" by either quickly replacing the entire pod or by replacing one or more components within the POD. The ease of simply replacing the entire POD reduces down time of the HPLC system. Data related to the servicing of the POD may be stored in nonvolatile memory fixed to the POD itself. Alternatively, the POD may be removed and rebuilt in a manner similar to a rebuild of the direct drive rotor and stator components. Once rebuilt, information related to the rebuild is stored in the memory of the POD and then the POD is ready for another quick swap once another POD needs servicing. A data repository may be kept on both the POD and on the actuator or motor. The data repository on the POD may be utilized to maintain data corresponding to total count or rotations of the valve, the # of rebuilds, and other data unique to the POD. The data repository may be, for example, a FRAM. The pcb attached to the actuator may include drivers for a position sensor and valve. The PCB may support a separate FRAM, IC and microprocessor that are responsible for managing the FRAM on the POD.

Those skilled in the art will appreciate that one or more localized data repositories may be utilized so that data concerning the valve is not lost when untethering the entire valve assembly (fluid valve, actuator, and motor), untethering of the actuator and POD (valve within the POD, actuator, and motor), or when untethering of the POD (valve within the POD) from the actuator and host system. When a data repository is fixed to the POD (for example, a PCB supporting FRAM and IC on the POD [valve]), power would be supplied to the IC and controlled via the PCB and IC of the actuator. The PCB on the actuator would also have its own FRAM as well as a microprocessor to manage both FRAM and ICs on the actuator and POD separately.

In certain embodiments of the invention the position of the valve within the valve housing or POD is determined and stored in localized memory. Position sensors of known suitable construction may be utilized to determine the position and amount of rotation. Either incremental encoders or absolute position sensing may be useful to determine the position and rotation of the valve. Current encoder solutions can be categorized into two primary types: incremental and absolute. Incremental encoders require initialization of an incremental movement device to determine starting position when the host system is powered on. After initialization, each move of the device is monitored for a relative change in position. Absolute position encoders do not require an initialization sequence since position is always known. Both encoder types can be expensive, depending on the required accuracy and precision.

By way of example and without intending to limit the type of suitable valve position sensor, an encoder will be described in relation to determining valve positions that define port-to-port connectivity. Use of an encoder may reduce form factor and cost of each valve unit because incremental encoders can be compact and may cost less than absolute position sensors. However, encoders have required an initialization process each time the valve is started. The valve initiation requires valve motion and reduction of useful life of the valve. Providing the ability to use the valve without the need for re-initialization is expected to increase the valve lifetime.

Although the description in this document references encoders, the functionality of the valve does not depend on encoder type: incremental versus absolute. Further, it may be desirable to optimize the encoder transitions aligned with port locations (e.g. 60 equally spaced windows such that a window transition is always located at port locations) for a range of equally spaced port configurations, however, it is not necessary to align windows with port locations. That said, storing in memory the preferred port positions may enhance repeatability and accuracy of motions since locations between windows are maintained with electrical signal "balancing" between physical windows or detents.

Combining an incremental encoder with nonvolatile memory may provide a low cost, small form factor solution that emulates the advantages of an absolute position sensor while providing additional benefits in storing information related to the valve, such as port configuration, manufacturing data, lifetime/usage, operating specifications, material compatibility, etc. Specific information related to use of the valve can travel with the valve rather than being stored and managed on a host computer. Moving the valve and/or rebuilding valve components allows the host system to recognize the valve usage information with minimal data management effort. After a first initialization the valve stores all motions in memory. Anytime the valve is powered up, the last known position can be determined from memory and the valve actuated without initialization.

Due to mechanical variations in the assembly, the valve ports may not be optimally aligned, even with nominal positioning based on encoder feedback. Optimal positioning of the port locations can be stored in memory as a lookup table. Actual encoder feedback can be interpreted via the lookup table and corrections to the valve position can be made. The lookup tables can be constructed using a variety of methods, one of which entails measurement of backpressure to find the most "open" port alignments.

Additionally, the ability to store the last known valve position improves efficiency of operation and reduces the need to expend useful motions in initializing a valve multiple times. Once valve position is known, it does not change unless the valve is actuated. If a system failure occurs during a valve motion, the "successful motion" flag will not be set, and the controller system recognizes that the valve will need to be initialized again.

The incremental encoders of the present invention may employ a number of incremental count stations, or windows, which are suitable for the given application. It has been determined by the applicant that a 60-window incremental encoder provides broad applicability to various common valve variants, including 6-port, 8-port, 10-port, and 12-port valves.

In certain embodiments of the invention that include an actuator with removable PODs, memory can be located in multiple, separate locations, but connected to allow communication and sharing of information. The actuator may have a record of every POD used over the life of the actuator, along with POD replacement dates and total number of POD replacements. The POD can maintain its own relevant information and be separated from a particular actuator without losing its unique data.

In terms of encoder functionality, once the valve is initialized, the last known valve position can be stored in nonvolatile memory. As a valve is actuated, a value can be written to the onboard memory indicating a successful move, i.e. the host system can determine positioning of the valve, or know if re-initialization is required.

An additional advantage of local storage of valve movement information is maintaining updated actuation counts for the valve that can be used to predict valve failure as the valve approaches useful lifetime, regardless of where and when the valve is used. Since valve information can be read from valve memory, the host system can ensure compatibility with a given HPLC process and valves can be considered "movable" between various processes and systems. In addition to integration with the valve as a complete unit, memory can be located in multiple locations on a valve assembly, e.g. actuator versus replacement POD, and managed and maintained as separate entities.

In terms of encoder functionality, once the valve is initialized, the last known valve position can be stored in nonvolatile memory. As a valve is actuated, a value can be written to the onboard memory indicating a successful move, i.e. the host system can determine positioning of the valve, or know if re-initialization is required. Further, interpretation and execution of commands specific to other valve configurations is possible, for example different physical encoder types or configurations, different drive system ratios and step counts, etc.

Valve electronics supporting the flow control component may be integrated with the valve and scaled appropriately. For example, a direct drive valve may have the memory, processor, motor driver, and encoder sensors consolidated to a single PCB and mounted to the bottom of the valve's motor, or the memory, processor, and encoder sensor can be mounted on the back of the motor and electrically coupled to an external motor driver. Alternatively, the actuator and POD can have dedicated, separate FRAM (memory) to track individual lifetime data corresponding to each. Various information may be inputted to the memory unit during assembly and test of the valve, including information related to date of manufacture, component serial number, component and subcomponent part numbers, valve port configuration, operating conditions (for example, max temp, max pressure, chemical compatibility, valve fluid path materials, etc.), maximum number of expected motions, last known position of valve, or zero motion count. While using the valve, additional information may be gathered and stored in the localized data repository including, successful move flag, last known position, cumulative number of motor and valve motions or total rotational travel; value for maximum number of motions before the valve maintenance or service.

The localized data repository may preferably utilize local memory units, such as FRAM because this type of nonvolatile memory exhibits substantial write endurance that allows (nearly) unlimited read/write operations, simple data management, and no externally-supplied power required to store data "indefinitely". Further, data corresponding to the following events is easily stored: serial number, part number, manufacturer, date of manufacture, drive system ratio, type of encoder, cumulative amounts of shaft motion, last known position of valve, optimal position of port locations, motor motion errors, repair/replacement information, are stored in the valve memory, or application specific information.

In certain embodiments the flow control component includes data information to identify expected maintenance events and predicted lifetime. The flow control component includes a processor, position sensor, FRAM, and a motor controller. The system uses the position sensor (encoder counts) to track total motion of the valve. Also, encoder counts and torque can be used to calculate total work. Further, motion errors can be recorded and compared to predict failure of the valve.

Data stored can include individual tracking of total motions, number of rebuilds, date of rebuilds and the history of paired serial numbers. Translation or interpretation of various motor and encoder expectations of the HOST computer (processor, encoder, FRAM, motor controller) allows the valve to integrate with a variety of HOST computers with software specific to a type of drive system or encoder system. Although a host system may store information related to motion, the "state" of the valve is not portable, in that valve information is currently stored in a database of a host computer that may not be portable. An advantage of the present invention includes reduced cost, a new efficiency of (portable) data management, and the introduction of a portable historical record of valve usage. Additional advantages include minimization of motion of the valve by avoiding the repetitive initialization of valve position that is presently required in incremental encoder-equipped valves. Multiple FRAM ICs can be used on a single valve to track history of the actuator and any replacement fluid path components (POD) separately. The actuator lifetime can be significantly higher than the replaceable fluid path sub-assembly of the valve (POD). Recording usage history of the actuator allows for enhanced tracking, e.g. a list of POD serial numbers that have been installed on the actuator over the actuator's lifetime.

The present invention represents an improvement over conventional systems at least in that the valve's on-board memory may be two-way, providing both read and write capabilities in a portable memory configuration. Moreover, rather than simply reporting a maximum expected lifetime, valve configuration, etc., the system of the present invention can store information related to the current valve usage, which can be compared to a maximum expected valve lifetime, thereby removing the need for the instrument controller to store and track specifics for the population of valves that will be installed on the controller system throughout the controller system's lifetime. In other words, data management is simplified through the present invention with data portability.

In certain embodiments the motor driver chip detects when the motor fails to make a step. This detection indicates that the torque has exceeded the design limits. The present invention further detects if the motor occasionally misses a step, or if the motor fails to move at all indicating a more serious motion problem. The controller may then try to free the stuck motor by increasing the drive current up to a maximum determined limit.

The number of failed steps, whether the motor failure is cleared by increasing the motor current, and whether the motor is able to return to normal operation at the normal current are all retained in local memory. Shaft motion is detected with either a magnetic detector (on-axis, or off-axis), or an optical detector using multiple windows to determine movement. Encoder counts are correlated to degrees of rotation. After each motion the memory will be updated by incrementing the total lifetime rotation with the last motion and incrementing the total movement counts by one. In this manner a cumulative or running total of the total rotation (which can be correlated to degrees) and the number of individual motions is saved. A movement of 60 degrees counts as one, and a movement of 120 degrees (or any other angle change) also counts as one, as long as each is a continuous motion. Additionally, a number of missed steps may be documented (motor driver issues a step but detects that the shaft did not move). This could be considered a "soft-error" that can be corrected on the fly by driving the motor until it reaches the target position. Also failures to reach the desired position may be documented and saved. These errors would be "hard-errors" and would require notifying the host system.

A further example of this "lifetime partitioning" is the rotor and stator are tested to some total number of motions. One rotor/stator material combination, at a specified maximum pressure will last 30 k motions, while another combination will last 60 k motions. The actuator and motor (typically taken together) are required to last 800 k motions, but this is one excerpt from a specific product requirement, i.e. these limits can vary with application or design.

The maximum limits, lifetime limits, maintenance requirements and other preset limits are set based upon reliability testing. For example, through testing it has been determined that a POD will exhibit more wear than the actuator. Therefore, the POD is replaced at different intervals than the actuator or motor. With the direct drive valve, the rotor and stator are replace every X number of motions. The drivetrain and motor are serviced at different intervals; for example every y and z number of motions respectively. The drive train of the direct drive valve is easily separated from the motor and can be replaced quickly. Motor lifetime may exceed 5 million motions and may require the least amount of maintenance.

The HPLC valve of the present invention actively communicates valve lifetime and possible maintenance needs to the HPLC unit or system based on continual monitoring of motions and torque feedback at the valve component level. The HPLC of the present invention actively updates valve information, at the valve level, such that the valve is portable and independent of the host system. The portability allows the valve to be untethered from the host system and used elsewhere without loss of identifying information, lifetime history, and initialized position of the valves' fluid path configuration.

Embodiments according to aspects of the invention include a microfluidic multi-port control valve assembly of a High Pressure Liquid Chromatography (HPLC) unit having a localized repository for stored cumulative wear indications which travel with the valve assembly for predictive failure of components of the microfluidic multi-port control valve assembly. The valve assembly includes a multi-port valve, a data storage repository, an actuator assembly, a position sensing member and a computing controller. The multi-port control valve has a valve housing enclosing the multi-port control valve. The data storage repository is fixed to the valve housing. The actuator assembly couples to the multi-port control valve and the actuator assembly includes an actuator that actuates the multi-port control valve. The position sensing members are coupled to both the multi-port control valve and the actuator of the actuator assembly, wherein the position sensing members create signals corresponding to position and movement of the multi-port control valve and the actuator of the actuator assembly. The computing controller is electrically coupled to the actuator assembly, position sensing member, and data storage repository. Data associated with the signal corresponding to position and movement of the multi-port control valve and the actuator of the actuator assembly is stored in the data storage repository.

The embodiments according to aspects of the invention may additionally include a data storage repository having a non-volatile memory for data storage. Further, the non-volatile memory may be FRAM. Also, the position sensing members may be in the form of an encoder contained within a valve housing. The valve housing may be a modular pod or integrated with the actuator assembly. Data corresponding to the amount of rotation of the multi-port control valve is stored in a non-volatile memory of the data storage repository. Alternatively, data corresponding to the amount of rotation of the multi-port control valve is stored in a resident non-volatile memory of the computing controller. Alternatively, data corresponding to the amount of rotation of the multi-port control valve may be stored in both non-volatile memory of the data storage repository and in a resident non-volatile memory of the computing controller. The stored data may correspond to wear characteristic indications selected from the group consisting of cumulative rotation of the valve, cumulative rotation of the actuator, and failed actuator start-ups. The stored data may further correspond to rebuild status of valve, valve position, serial number, part number, manufacturer, date of manufacture, drive system ratio, type of encoder, cumulative amounts of shaft motion, last known position of valve, optimal position of port locations, motor motion errors, repair information, maintenance requirements, or types of fluids used in the valve.

Embodiments according to aspects of the invention includes a flow control apparatus having localized memory for failure predication. The flow control apparatus has a flow control component, a data repository, position sensing members, and a computing controller. The data storage repository is mechanically fixed to the flow control component. The position sensing members are coupled to the flow control component, wherein the position sensing members creates a signal corresponding to position and movement of the flow control component. The computing controller is electrically coupled to the flow control component and data storage repository. Data associated with the signal corresponding to position and movement of the flow control component is stored in the data storage repository.

The data storage repository of the flow control apparatus of the present invention includes non-volatile memory that may, for example be non-volatile FRAM memory. Data corresponding to the amount of motion of the flow control apparatus is stored in the non-volatile memory of the data storage repository and in a resident non-volatile memory of the computing controller. Additionally, unique valve identifying data may be stored in the data storage repository, wherein the identifying data may correspond to repair status of the apparatus, position of components within the apparatus, serial number, part number, manufacturer, date of manufacture, cumulative amounts of component motion, last known position of components, optimal position of components, component errors, repair information, maintenance requirements, or types of environments used by the flow control apparatus.

Embodiments according to aspects of the invention may additionally include a method of evaluating a microfluidic multi-port control valve assembly of a High Performance Liquid Chromatography (HPLC) unit having a localized cumulative wear indicator for predictive failure of components of the assembly. The method includes the steps of initializing a microfluidic multi-port control valve assembly coupled to a High Pressure Liquid Chromatography (HPLC) unit, wherein movement of the multi-port control valve assembly is effected by an actuator assembly; controlling movement of the valve assembly and actuator assembly; obtaining position data corresponding to position of the multi-port control valve; obtaining movement data corresponding to movement of the multi-port control valve and actuator assembly; determining cumulative values corresponding to total cumulative movement of the multi-port control valve and actuator assembly; storing the position data, movement data, and cumulative values in a localized data storage repository fixed to the valve assembly which travel with the valve assembly; and comparing cumulative values with predefined limits.

The method according to aspects of the invention may further include the steps of storing data corresponding to the amount of rotation of the multi-port control valve. The localized data storage repository includes non-volatile memory. Further, the step of storing the movement data may include storing data corresponding to the amount of rotation of the actuator assembly. The method may also include storing actuator data corresponding to failed actuator start-ups. Additionally, the method may include the step of storing identifying data corresponding to rebuild status of the valve, the valve position, valve serial number, part number, manufacturer, date of manufacture, drive system ratio, type of encoder, last known position of valve, optimal position of valve port locations, motor motion errors, repair information, maintenance requirements, or types of fluids used in the valve.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should also be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The flow control component 10 of the present invention generally includes a valve assembly 14, actuator assembly 16 and motor 18. The flow control component 10 is illustrated as a microfluidic micro-port control valve assembly, however, those skilled in the art will appreciate that the flow control component could include various other valves and pumps of suitable construction. A direct drive control valve assembly and a modular pod control valve assembly are described in greater detail in conjunction with a description of the Figures.

Figure 1:
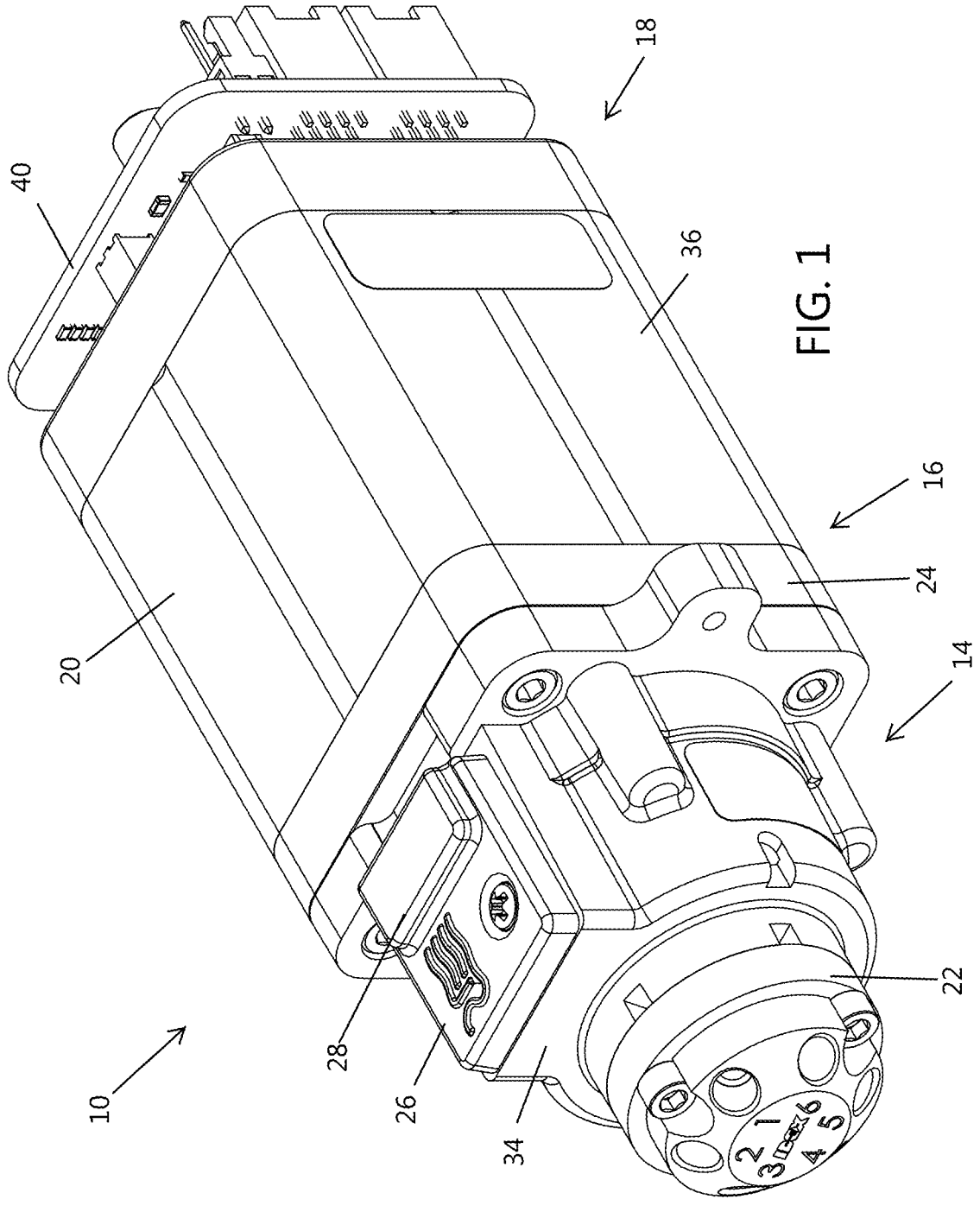
FIG. 1 is a front perspective view of a microfluidic micro-port direct drive control valve assembly in accordance with the present invention.
Figure 2:
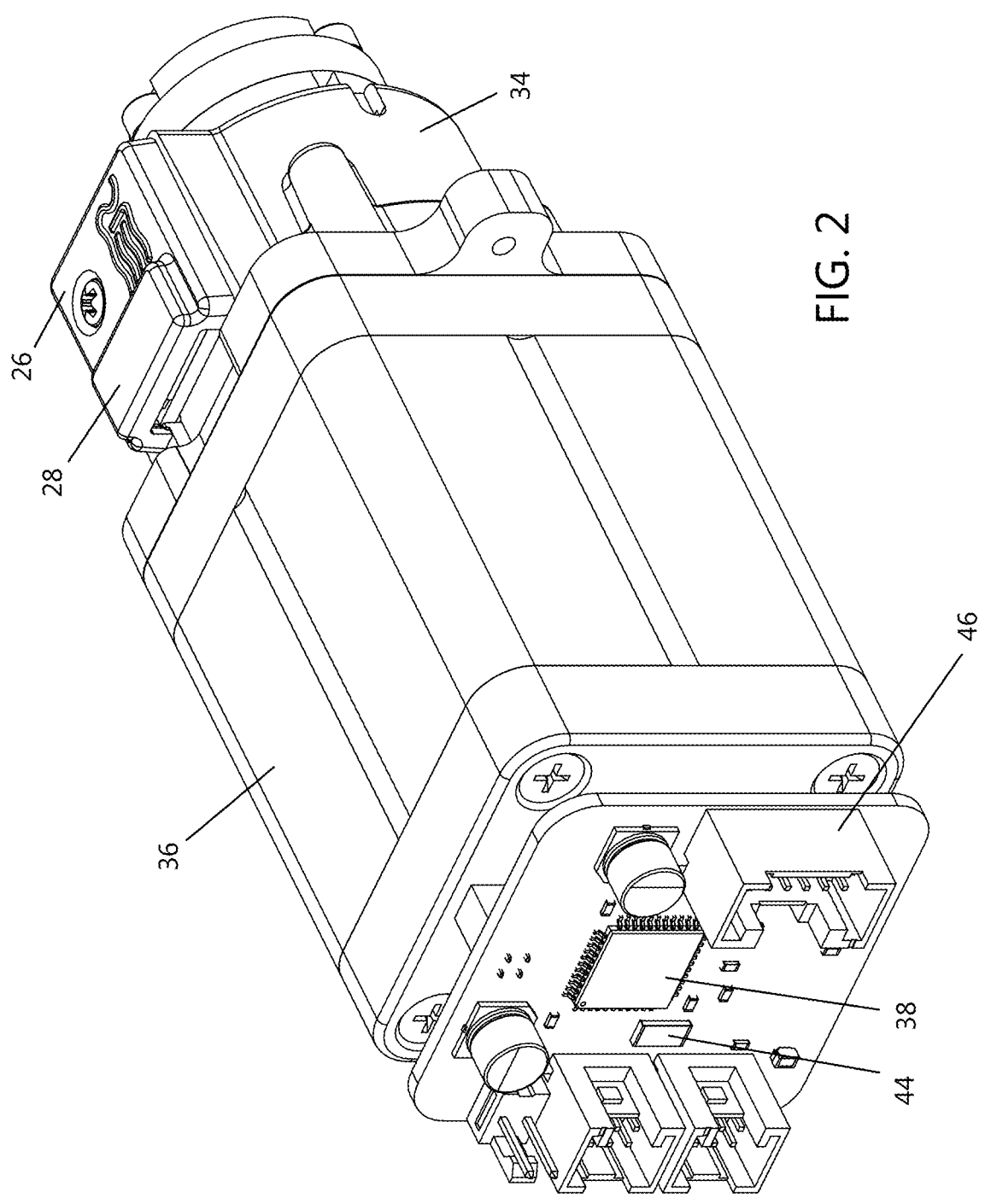
FIG. 2 is a back perspective view of a microfluidic micro-port direct drive control valve in accordance with the present invention.
Figure 3:
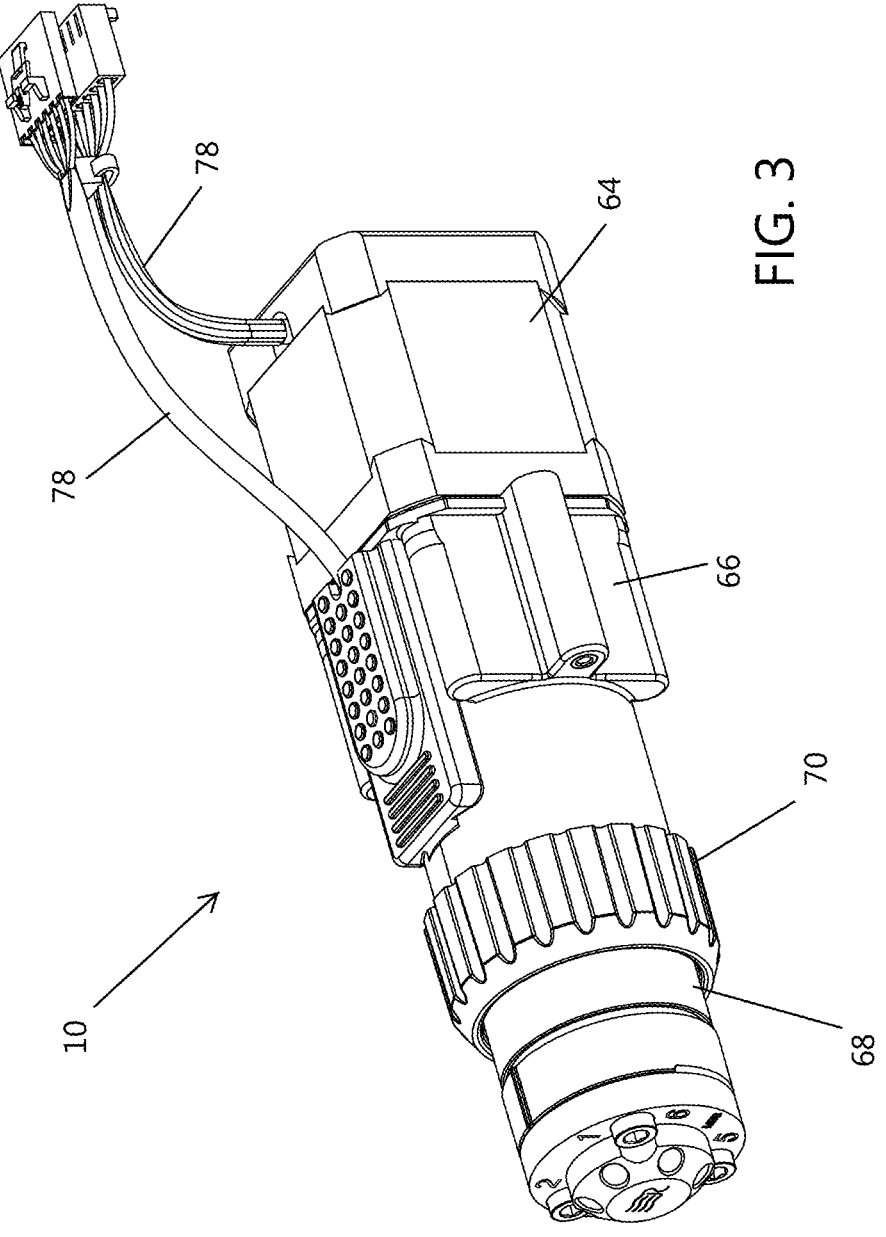
FIG. 3 is a front perspective view of a microfluidic micro-port modular control valve assembly in accordance with the present invention.
Figure 4:
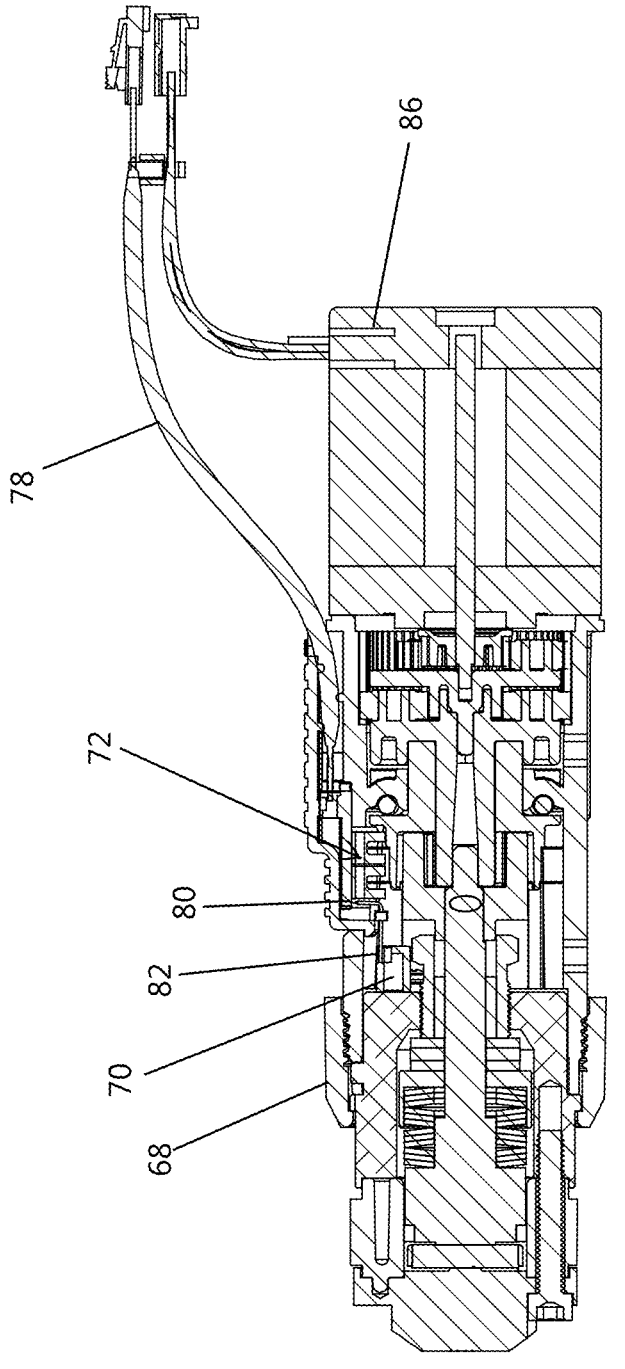
FIG. 4 is a partial sectional side elevational view of the microfluidic micro-port modular control valve assembly of the type shown in FIG. 3 in accordance with the present invention.
Figure 5:
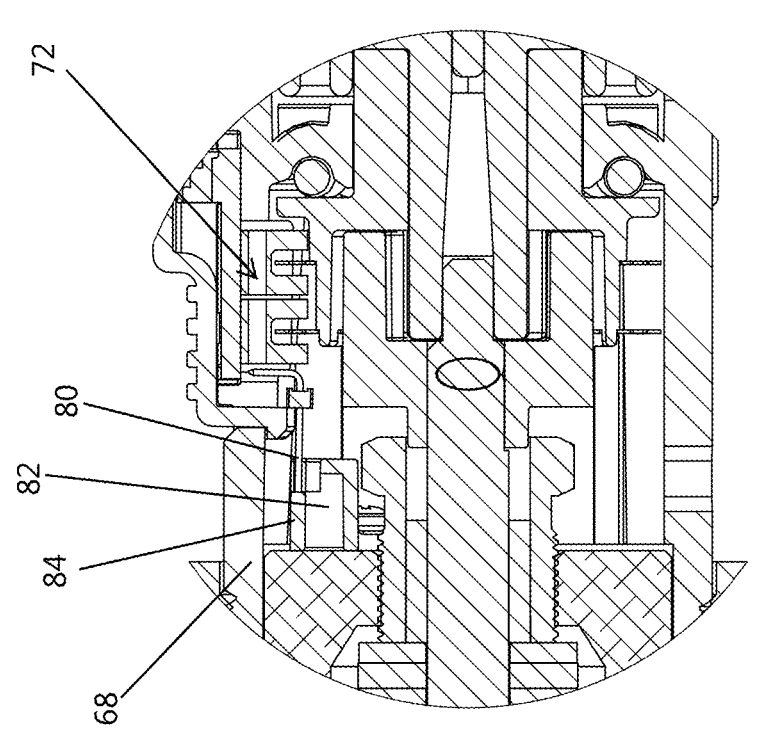
FIG. 5 is a partial sectional perspective view of a portion of the microfluidic micro-port modular control valve assembly showing the localized data storage repository fixed to a modular pod of the assembly in accordance with the present invention.
Figure 6:
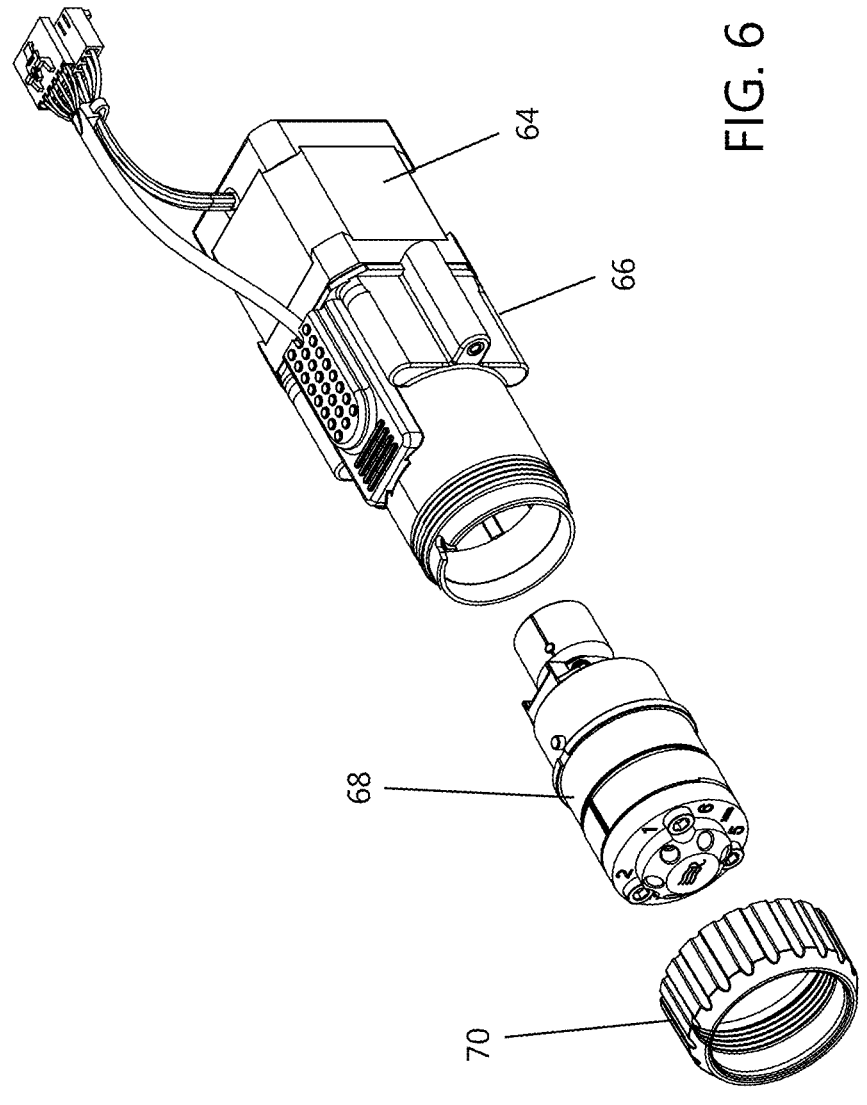
FIG. 6 is a partial exploded perspective view of a microfluidic micro-port modular control valve assembly in accordance with the present invention showing the modular valve pod separated from the actuator.
Figure 7:
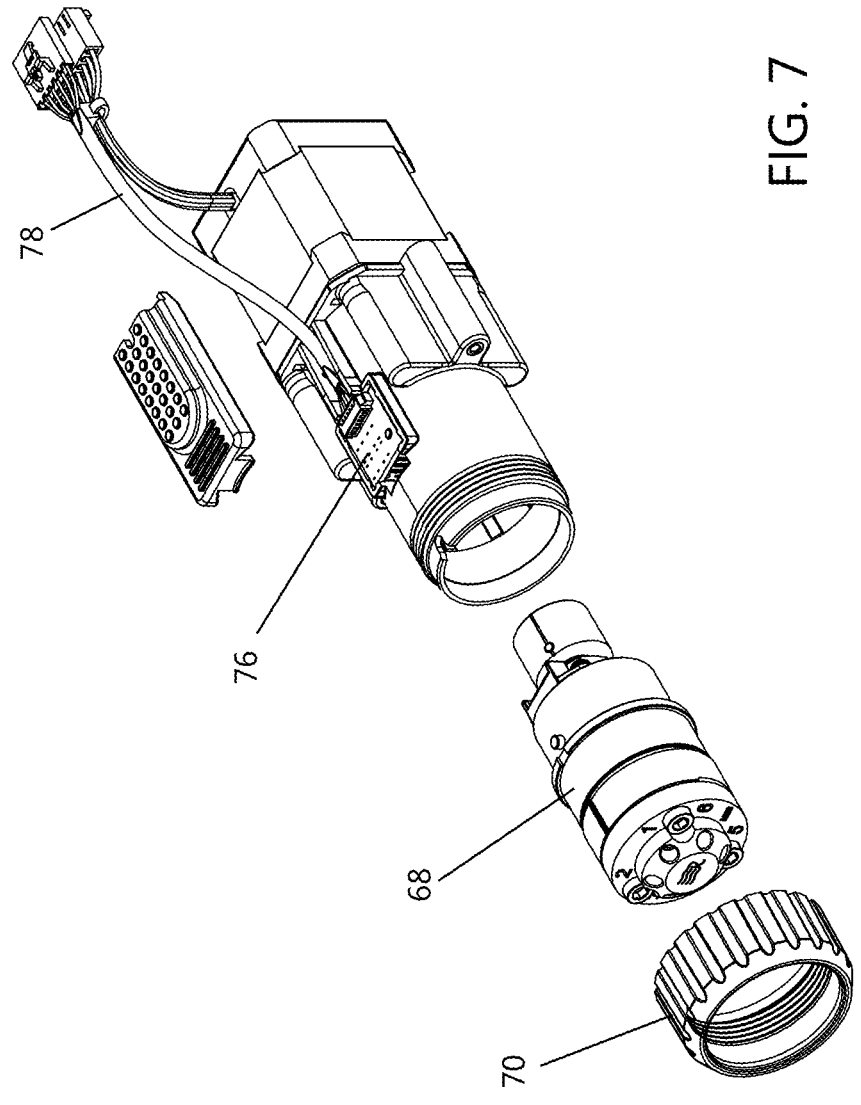
FIG. 7 is a partial exploded perspective view of a microfluidic micro-port modular control valve assembly in accordance with the present invention showing the modular valve pod separated from the actuator and a cover of the pcb attached to the actuator assembly removed.
Figure 8:
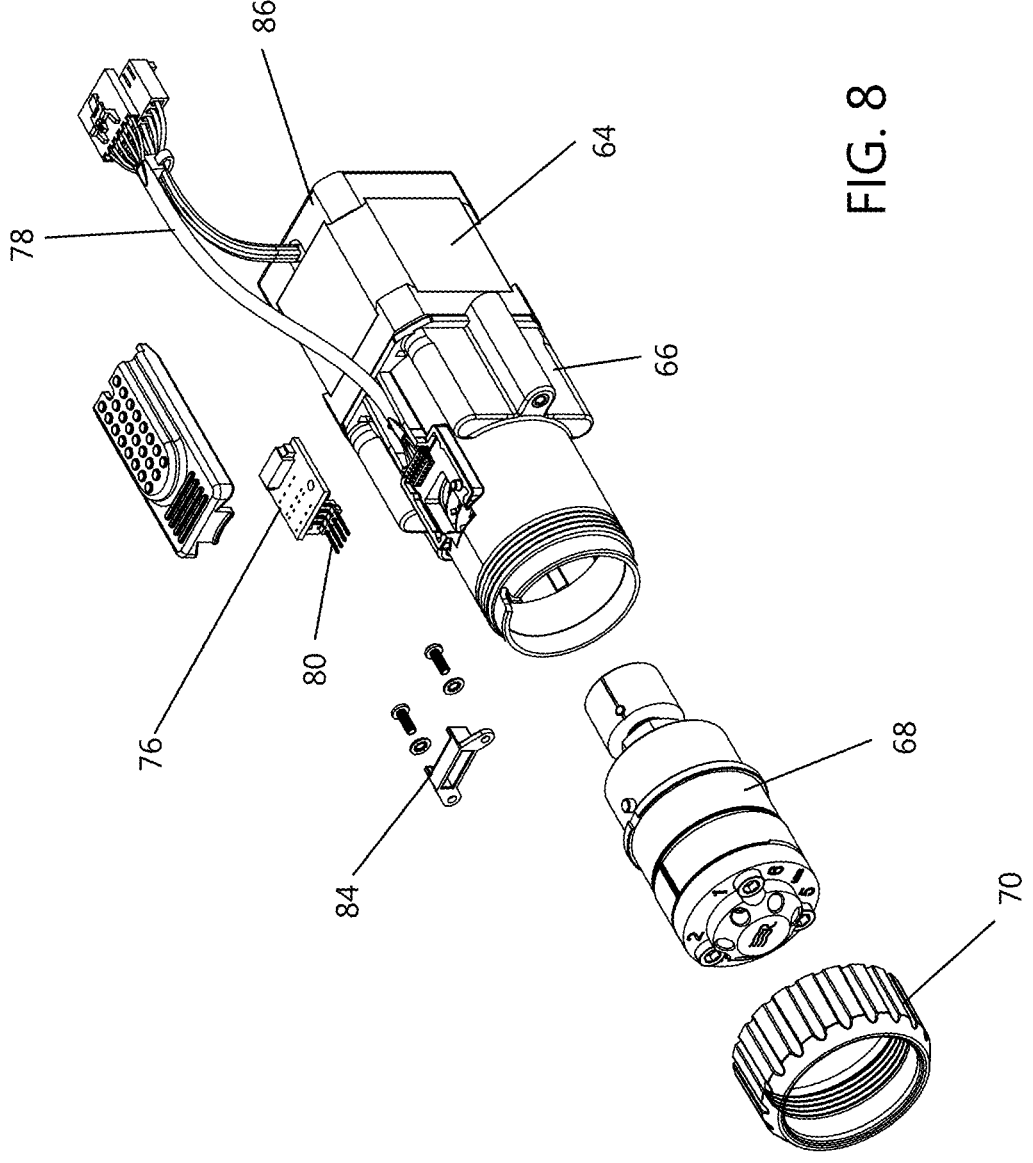
FIG. 8 is a partial exploded perspective view of a microfluidic micro-port modular control valve assembly in accordance with the present invention showing the modular valve pod separated from the actuator; showing the localized data storage repository separated from the modular pod; and the pcb separated from the actuator assembly.
Figure 9:
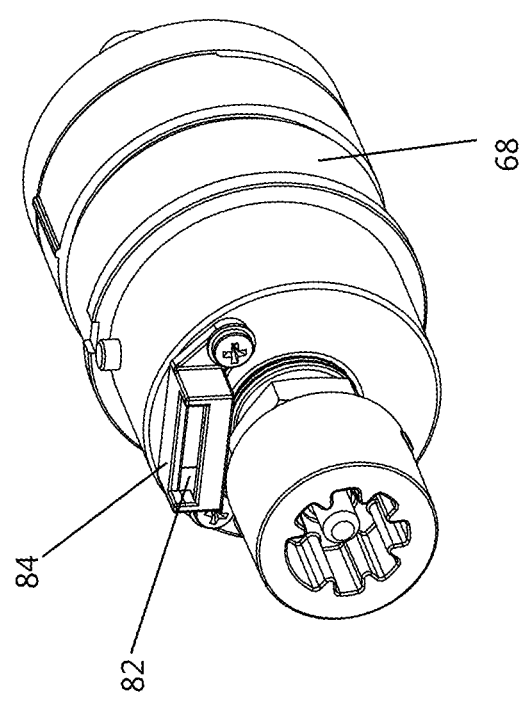
FIG. 9 is a back perspective view of a modular valve pod in accordance with the present invention shown with the localized data storage repository fixed to the valve housing of the modular valve pod.

With reference to FIGS. 1 and 2 a direct drive valve assembly of the present invention is illustrated. The direct drive valve assembly 20 is primarily comprised of a valve assembly 22 and an actuator assembly 24. The valve assembly includes a valve housing 34 and a rotor contained within the housing 34. The actuator assembly 24 includes an actuator housing 36 having a stepper motor and drive assembly that transmits rotational movement from the motor to the rotor element within the housing. The drive assembly couples the motor to the valve assembly 22. The drive assembly may include a valve shaft and a planetary gear system. Alternatively the drive system may include a valve shaft that directly engages the motor without the use of intermediary gears. In this configuration, the decreased motor torque, resulting from the absence of a gear system, may be compensated for by applying a motor with greater torque. The Rheodyne Titan EZ valve, Model EZ670-000-4, manufactured by IDEX Health & Science, for example, achieves up to 7 in-lbs of torque combining a 42 mm tin can stepper motor with an injection molded planetary gear system.

The valve housing 34 is generally cylindrical-shaped, and defines a central passage axially there through which extends from the distal mounting end to the port end thereof. The rotor element may be mechanically coupled to the actuator assembly via a shaft adapter which rotatably engages the drive valve shaft to enable rotation of the rotor element. The valve shaft may be keyed so that any torque and rotation of the valve shaft about its longitudinal axis is transferred to the shaft adapter and ultimately the rotor element. Various other components and details of an acceptable embodiment of the valve, position sensor, actuator and motor are further described in U.S. Pat. No. 8,201,185B2 the entire disclosure of which is incorporated herein by reference.

The direct drive valve 20 of the present invention further includes a PCB 26 with corresponding local non-volatile FRAM memory 28 fixed to the valve housing 34. Additionally, a motor controller 38, electrical connections 46, integrated circuit, and a local non-volatile FRAM memory 44 are coupled to the motor PCB 40 coupled to an end of the actuator assembly housing 36. Control of the direct drive valve 20 will be described below in greater detail.

With reference to FIGS. 3-9 a modular microfluidic micro-port control valve assembly 60 of the present invention is illustrated. Generally, the multi position micro-fluidic valve system includes an actuator assembly 66 that couples to a drive motor 64 at one end of the actuator assembly and removably accepts a valve pod 68 on the other end. The actuator assembly includes a housing and a drive assembly rotatably disposed in the housing for rotational displacement of a drive shaft about a drive axis thereof. One end of the drive shaft is configured to couple to the drive motor 64 for selective rotation of the drive shaft about the drive axis. The multi-position fluid valve pod 68 is removably mounted to the actuator assembly and includes a corresponding valve shaft that is configured for rotational movement about a valve rotational axis thereof between a plurality of discrete fluid distribution positions. The valve pod further includes a quick connect coupling device 70 that is configured to selectively, removably mount the pod 68 to the actuator 66 to enable selective positioning of the valve device at a discrete one of the plurality of discrete fluid distribution positions.

Accordingly, a micro-fluidic valve system is provided that enables one or more multi-position valves to be removably mounted to a single actuator assembly each of which function as entirely different reconfigured liquid end systems. Unlike other valve systems, a six-position micro-fluidic valve system may be replaced with an eight-position micro-fluidic valve system or even a fifteen position micro-fluidic valve system, without modifying the structure of the actuator assembly. As will be described in greater detail below, once the selected valve pod 68 is aligned and mounted to the actuator assembly 66, and once the valve device is identified, the valve system can be operated to control more than one type of multi-position micro-fluidic valve. Moreover, in situations where a valve device requires repair and/or replacement, the valve can be easily removed for repair or replacement rather than requiring the removal of the entire valve system affixed in the analysis instrument. Consequently, the micro-fluidic valve system is much more versatile, and even results in significant cost reductions due in part to a reduced number of overall components.

The actuator assembly 66 is shown comprising a housing having a rectangular-shaped proximal portion that mounts to the drive motor 64, and a cylindrical-shaped distal barrel portion that removably mounts to the valve pod 68. The housing is generally provided by a shell structure that is preferably composed of a relatively rigid composite material designed for high strength. An interior wall of the housing defines a central through-chamber that extends axially through the housing from the proximal portion to the distal barrel portion. Near the center of the through-chamber, an annular bearing structure extends radially inward from the interior wall. The bearing structure includes an interior annular bearing wall forming a central passage, and a first bearing race portion on the distal side of the bearing structure. As best viewed in FIGS. 4 and 5, the annular first bearing race portion is positioned about the drive axis and is generally semi-donut shaped. A plurality of ball bearings are disposed in the first bearing race portion and cooperate with the annular bearing wall to provide rolling support of the drive assembly 26 about the drive axis.

The drive assembly includes a drive shaft and a gear carrier platform disposed at a proximal end of the drive shaft. The drive shaft is essentially an elongated spline shaft having a plurality of splines extending radially outward from the shaft axis thereof. The gear carrier platform, on the other hand, is generally disk-shaped and is affixed to the drive shaft in a manner such that the carrier platform and the drive shaft are substantially co-axial along the drive axis and function together as a single unit. When the drive assembly is assembled in the actuator housing, the carrier platform communicates with a gear train assembly, which in turn mates to the drive motor that drives the drive shaft.

In accordance with the present invention, the valve system includes a position sensor assembly 72 to determine the precise rotational switching position of the mounted valve. Through the precise determination of the rotational switching position, the valve device can be accurately actuated, and the amount of rotation may be determined and stored in a local data repository memory. Accordingly, regardless of which valve pod 68 is mounted to the actuator assembly 66, once the pod is first initialized the position of the valve can be accurately controlled and positioned without the need to re-initialize.

In a specific embodiment of the invention, the sensor assembly 72 includes one or more encoder wheels mounted to a rotating encoder spool that cooperates with corresponding stationary optical sensors to determine the absolute rotational position and orientation of the encoder wheels relative to the drive axis. Using a combination of optical sensors and two encoder wheels that are designed to cooperate with one another, multiple position porting scenarios (of the coupled valve pod 68) can be resolved with absolute position feedback.

Each encoder wheel 80, 81 contains a set of interior diameter windows and a set of outer diameter notches that allows a light signal to be transmitted there through. A pair of adjacent sensors mounted to a sensor PCB board 76 straddle the respective rotating wheel in an orientation to determine whether or not a notch or window is sensed. The encoder wheels work in conjunction with the optical sensors to absolutely locate a valve in discrete positions. Use of an encoder provides for incremental positioning of the valve. Accordingly, a valve device may range from having two discrete incremental positions to having more than fifteen discrete positions for precise control and operation thereof.

In order to strategically position the encoder wheels about the outer diameter of the distal barrel section of the encoder spool, the barrel section is slotted and configured to receive the corresponding tine portions extending radially inward from the inner wall of the wheel. These axially spaced apart encoder wheels can only be fitted to the distal barrel section of the spool in discrete orientations to assure proper mounting alignment. By aligning and mounting the selected valve device to the actuator assembly through a coupling device, the positioning of the valve device can be precisely controlled through a control unit (not shown) disposed between sensor assembly and the stepped drive motor. In essence, this configuration enables precision operation and positioning of the drive shaft, via the encoder wheels. Hence by first determining which multi position valve pod 68 is properly aligned and seated in the actuator housing, the control unit can be programed and operated to correspond to that detected valve so that precision operation for any valve can be realized.

To previously described the optical sensors are located on the PCB mounted to the actuator assembly. The coupling device includes a coupling member strategically oriented and affixed to the end of the valve shaft of the valve device for rotation about the valve rotation axis. A board receiving slot in a sidewall of the actuator housing provides an access port there through into the through-chamber. This port enables access by the sensors to the two encoder wheels when the drive assembly is operably mounted to the housing. Hence, once the encoder spool/drive assembly is assembled, as mentioned, the actuator PCB can be fitted into the board receiving slot in a manner allowing the sensors to straddle the edge of corresponding encoder wheels. Various other components and details of an acceptable embodiment of the POD, position sensor, actuator and motor are further described in U.S. Pat. No. 7,201,185B2 the entire disclosure of which is incorporated herein by reference.

The modular microfluidic micro-port control valve assembly 60 of the present invention further includes electrical conduits 78 to couple valve pod 68, actuator 66, and motor 64 to an external system. Further, a localized data repository in the form of FRAM memory 82 is contained within housing 84 and coupled to the pod 68. Electrical leads 80 extend from the actuator PCB and electrically interconnect the local memory 82 with the actuator and motor controller 86.

Figure 10:
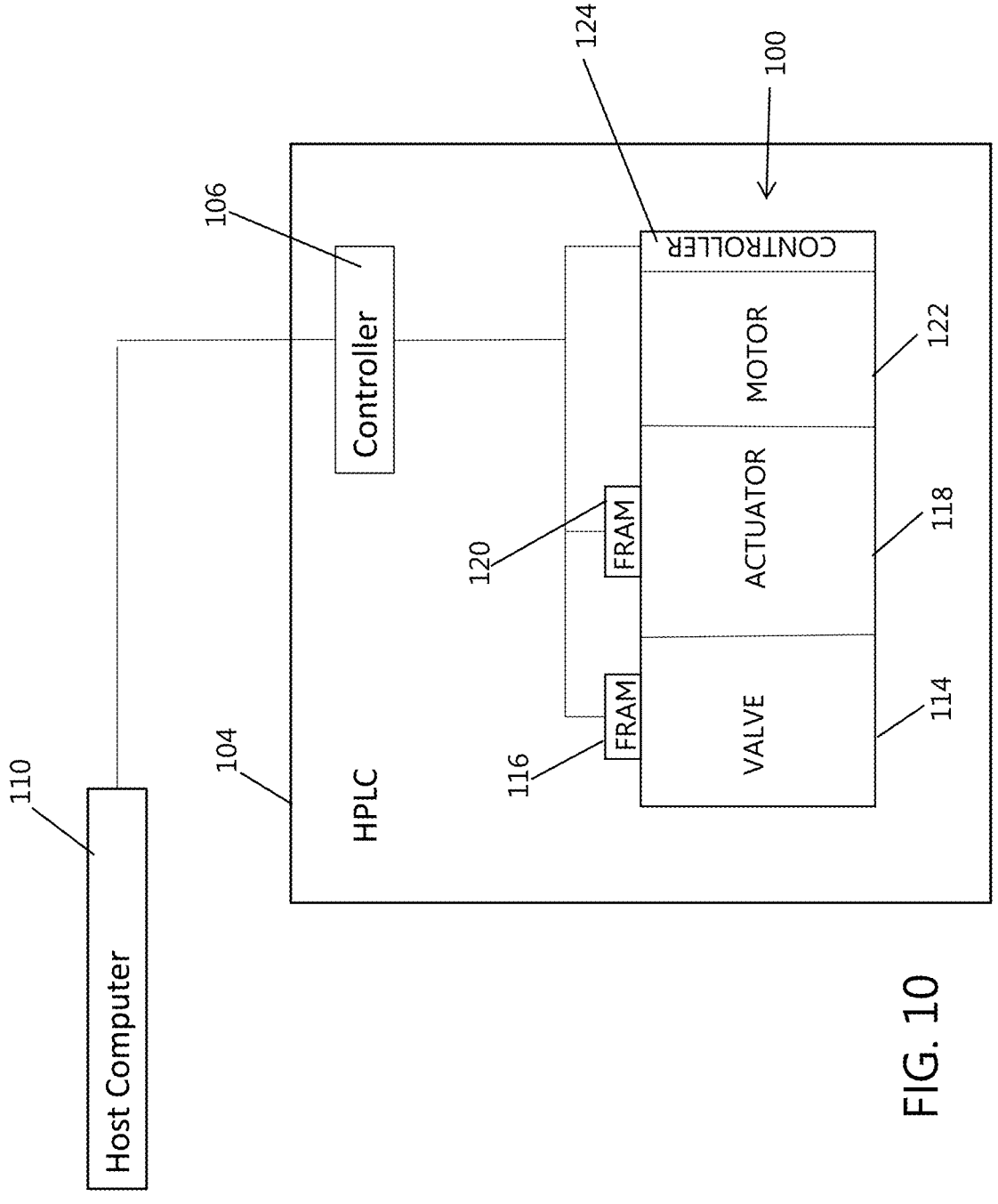
FIG. 10 is a schematic of a block diagram showing the electrical coupling of a host computer to the controller of an HPLC unit and sub components of the unit in accordance with the present invention.

With reference to FIG. 10, a microfluidic micro-port control valve assembly 100 is generally illustrated in conjunction with an HPLC unit 104 and an external host computer 110. The valve assembly includes valve 114 having its own localized memory 116 attached to the valve housing, an actuator 118 having its memory 120 attached to the actuator housing, and motor 122 having a drive controller and processor 124 coupled to the motor. The valve memory 116, actuator memory 120 and controller 124 are all electrically coupled to the host computer 110. The HPLC may have a resident controller 106 that acts as an intermediary between the host computer 110 and the valve memory 116, actuator memory 120 and controller 124. The control and use of the valve assembly will be further described in conjunction with a description of FIGS. 11-16.

Figure 11:
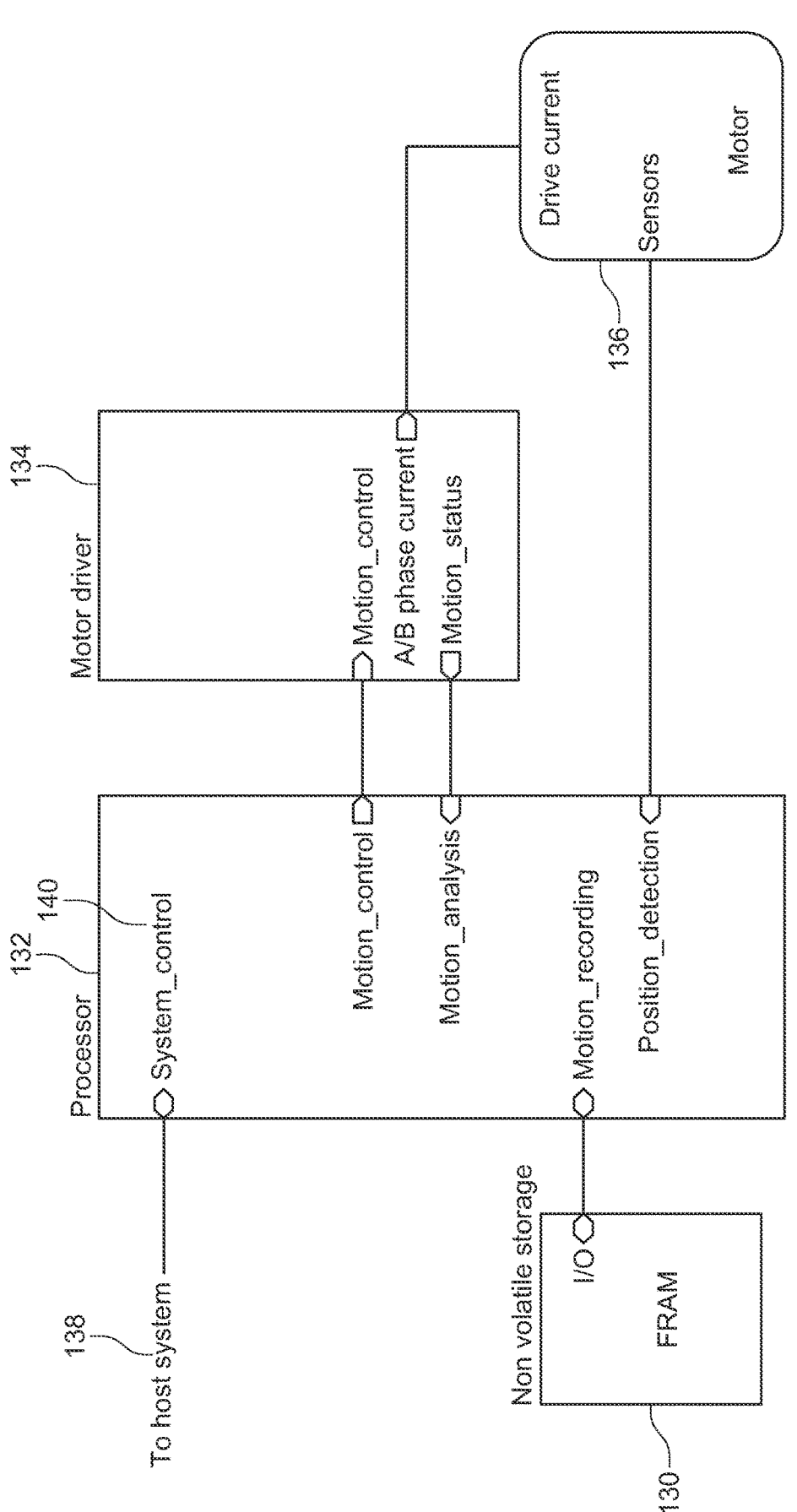
FIG. 11 represents an example of a portion of a circuit diagram of an on-board, non-volatile memory unit coupled to a controller of a flow control component that is coupled to a host computer.

FIG. 11 illustrates a portion of a circuit diagram of an on-board, non-volatile memory unit coupled to a controller 132 of a flow control component that is coupled to a host computer 138. The controller is coupled to a motor driver 134 and position sensor 136 to provide motion control and motion analysis of the valve and motor. Data or values associated with the motor and valve motion is stored in the nonvolatile memory but may also be communicated to the host computer 138 through a system control 140.

Figure 12:
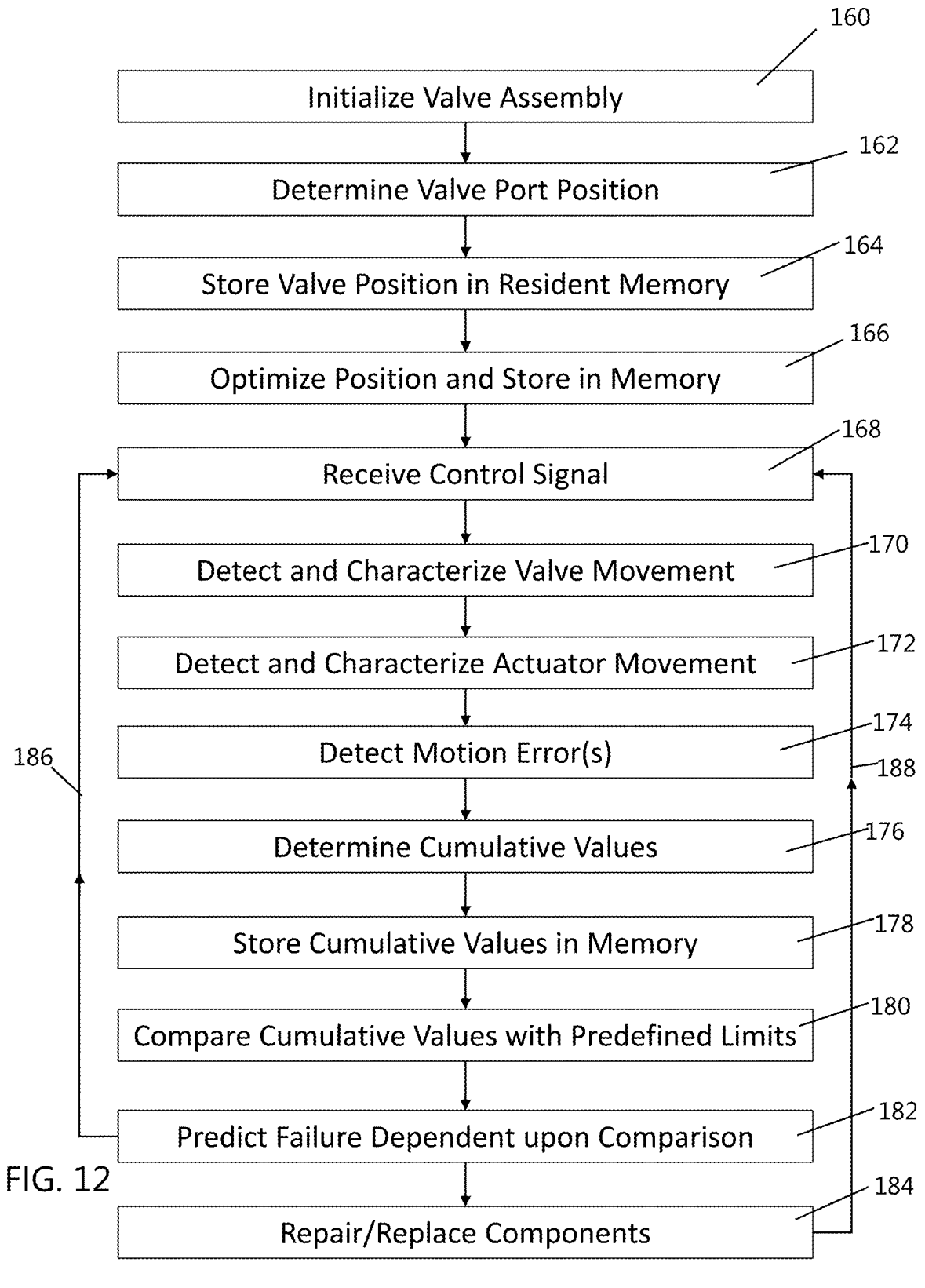
FIG. 12 is a flow diagram illustrating control of an interchangeable flow control component having localized data storage to allow predictive failure of the component independent of a host system.

Typical use of a flow control component or more specifically a microfluidic micro-port control valve assembly is illustrated in FIG. 12. The first time a valve is used in an HPLC, for example, the valve assembly must be initialized 160. The initialization of the valve assembly includes the steps of determining the valve port position 162 and storing the valve position in local or resident memory 164. The valve controller may further perform a calibration sequence to determine the optimal position of the valve and this position is also stored in the local memory 166. Once the valve has been initialized the valve may be utilized to control the flow of fluids in a system. The valve may receive a control signal 168 that controls movement or actuation of the valve. Position sensors coupled to the valve and controller detect valve movement and transmits a signal to the controller corresponding to the detected movement. The signal is then processed and the controller may store values in the local memory that characterize the valve movement 170. The position sensors may also be utilized to transmit a signal to the controller that corresponds to the detected movement of the actuator (drive shaft) coupled to a motor. The signal is then processed and the controller may store values in the local memory that characterize the detection and movement of the actuator 172. Alternatively, the motor driver may be utilized to determine whether a command sent to the motor results in motor movement. The controller and motor driver may be further utilized to detect one or more motion errors 174. The controller may then determine cumulative values associated with valve movement, motor movement and motor errors 176. Values associated with the cumulative values are stored in local memory 178. The control further analyzes and compares the cumulative values with predefined limits 180. Values associated with the predefined limits are also stored in local memory and may be adjusted or modified by the user. If any of the cumulative values exceed a predetermined limit, then a corresponding action is initiated. For example, the controller may then send a signal to the host system indicating that one or more of the valve components need repair or replacement. Additionally, the results of the comparison of the cumulative values to the predefined limits may further be utilized to predict potential failure of a component 182. If no failure is predicted, the valve continues to receive control signals 186. If a failure is predicted, the necessary component is repaired or replaced and then the valve is put back into service and the valve continues to receive control signals from the controller 188.

Figure 13:
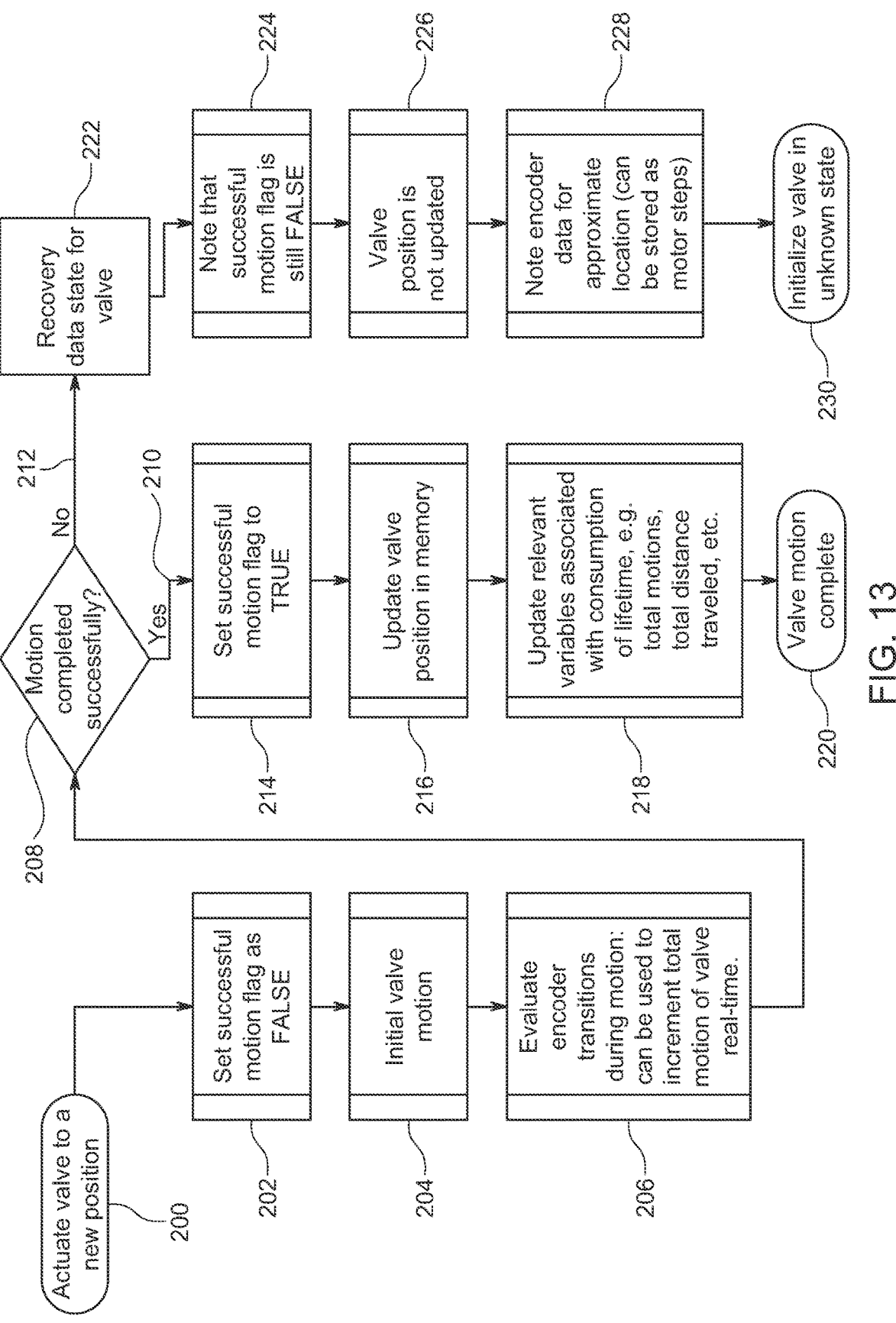
FIG. 13 is a flowchart setting forth an example operation of an incremental encoder of the present invention in connection with an incremental motion controller for a valve.

FIG. 13 illustrates a process or routine that the controller and motor driver utilizes to actuate the valve to a new position 200. First the controller sets a successful motion flag as false 202 and then initiates valve movement 204 by sending a motion input to the motor. Signals from the position sensor are then evaluated to determine movement of the valve. The signals may be evaluated in real time to control the motion of the valve in increments 206. The controller analyzes the position sensor signal and determines if the motion completed successfully 208. If the motion completed successfully 210 the controller sets the successful motion flag to true 216 and then updates the valve position in memory 216. The controller also updates in memory data or values associated with cumulative motion or total distance travelled corresponding to the valve and motor 218. The controller then indicates the valve motion is complete 220. If the controller determines that the motion is not completed successfully 212, the controller sets the recovery data state for the valve 222 and the controls stores in memory the successful motion flag is false 224. Further, the controller does not update valve position 226 and the signal from the position sensor is analyzed to determine an approximate position of the valve 228. The valve is then initialized in an unknown state 230.

Figure 14:
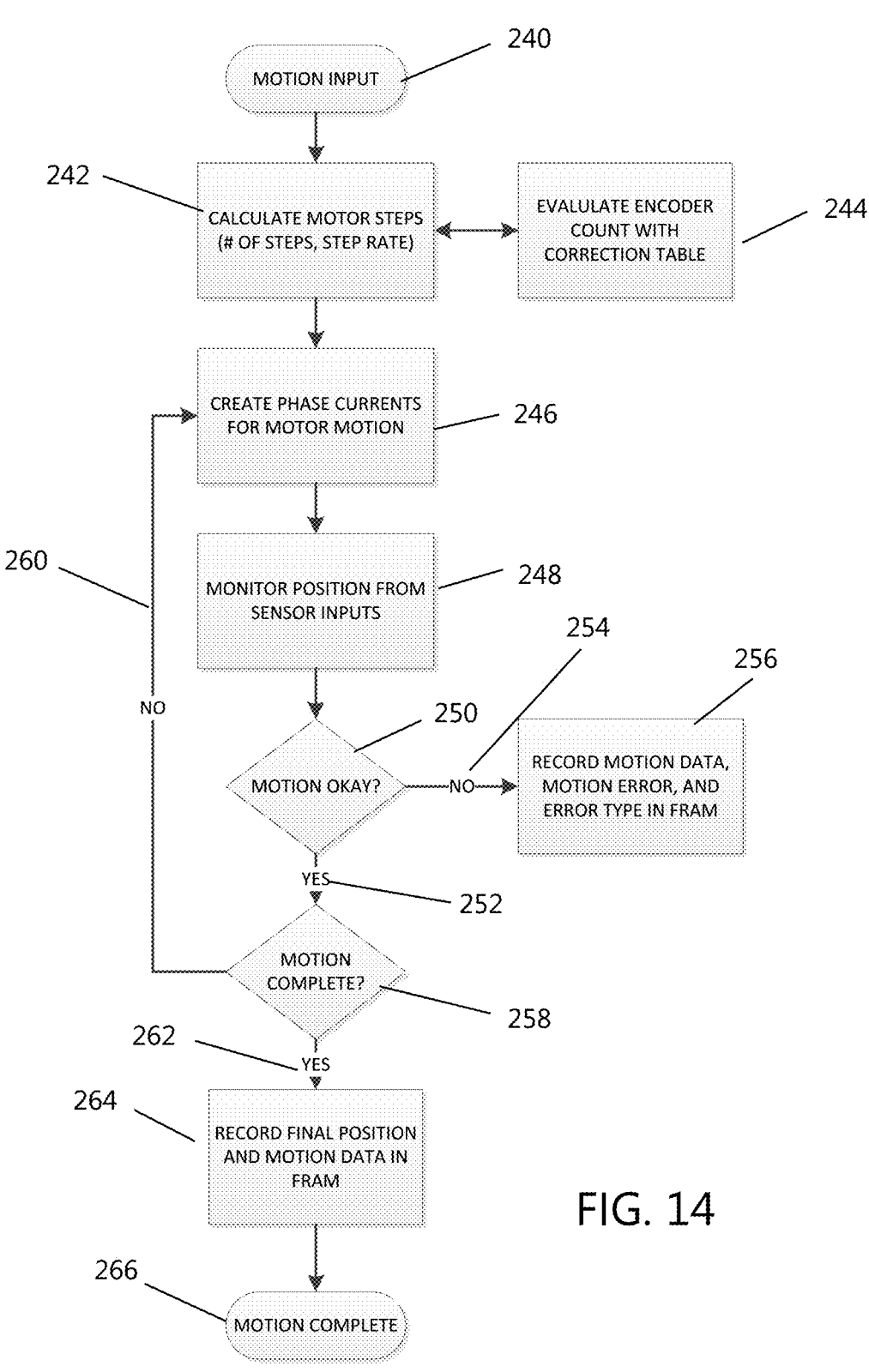
FIG. 14 is a flowchart setting forth an example operation of an incremental encoder of the present invention in connection with an incremental motion controller for a valve.

FIG. 14 illustrates motor motion analysis and control. The motor driver receives a motion input 240 and the controller calculates the amount of motor movement. The amount of motor movement may characterized as steps and the number of steps and the rate of steps 242 both of which may be stored in local memory. The signal from the position sensor may be analyzed and compared to a correction table 244 stored in local memory. The motor driver then creates a phase current for motor motion 246 and signals from the position sensors are monitored to determine the amount of movement 248. The controller then analyzes the signals and determines whether the motion is acceptable 250. If the motion is not acceptable 254 the motion data, motion error and error type is stored in local memory 256 and the controller and motor driver may create a revised phase current for the motor. If the motion is acceptable 252 the controller determines whether the valve motion is complete 258. If the motion is not complete, 260 the motor driver creates a phase current and the motor motion is repeated (loop 260). If the motion is complete then values corresponding to the amount of motion and the final position of the valve are recorded in local memory 264 and the controller indicates the motion is complete 266.

Figure 15:
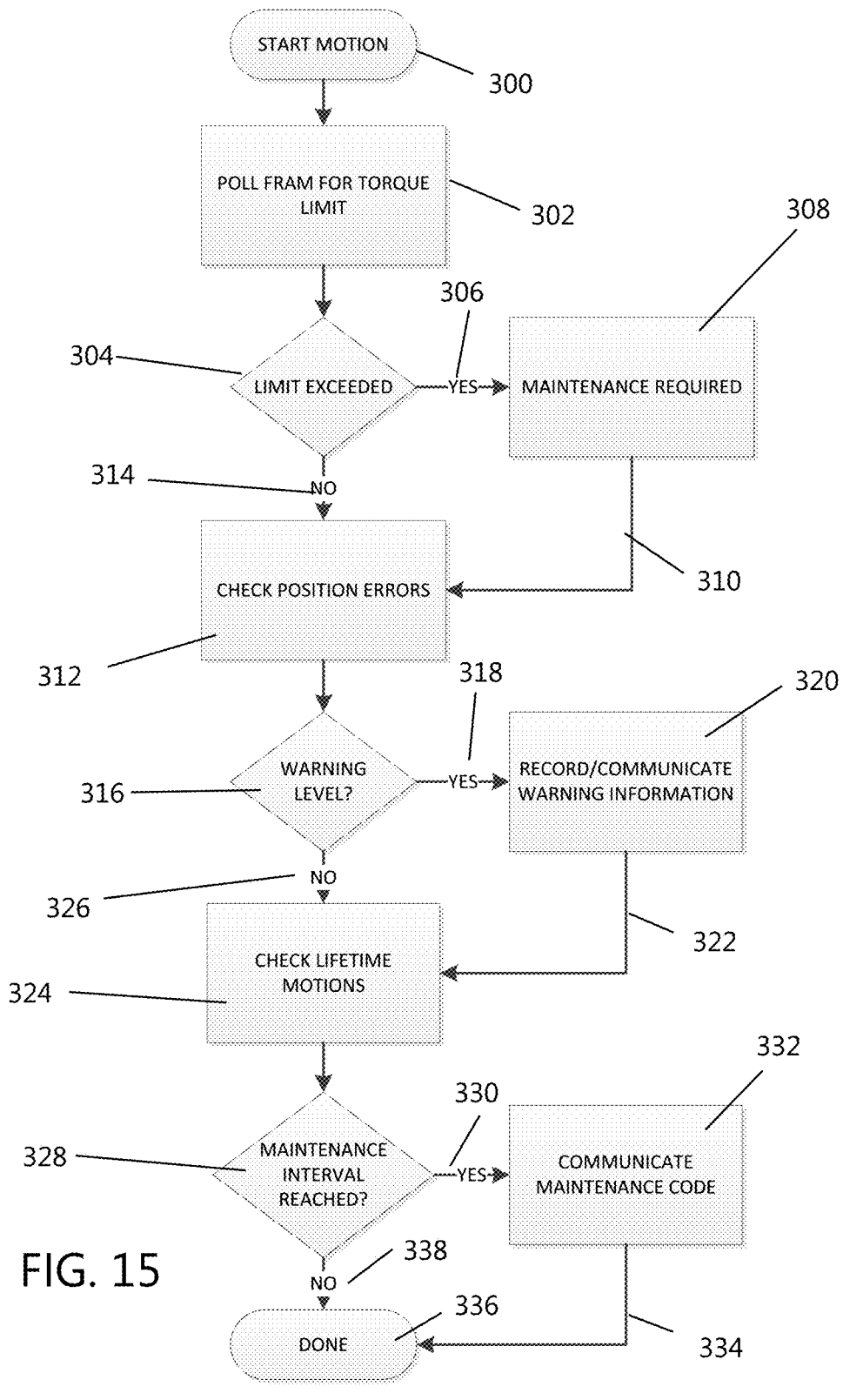
FIG. 15 is a flowchart setting forth an example control of an incremental motor of the present invention in connection with an incremental motion of a valve.

FIG. 15 illustrates the process sequence of the controller and motor to monitor and predict valve failure. When the motor driver sends a signal to the actuator to start valve motion 300, the controller compares predefined torque limits stored in local memory with torque calculated from motor driver feedback 302. The controller then determines if the predefined torque limit has been exceeded 304. If the limit is exceeded 306 then the controller creates a signal indicating that maintenance is required 308 and continues 310 to check for position errors 312. If the controller determines that the torque limit has not been exceeded then the controller continues 314 to check for position errors 312. The controller then determines if position errors are at a warning level 316. The warning levels are reached 318, the information is stored in local memory and the controller sends a signal communicating the warning information 320. The controller then continues 322 to analyze the data to determine if cumulative motion exceeds predefined limits 324 and 328. If the warning level has not been reached 326 then the controller proceeds to analyze the data to determine if cumulative motion exceeds predefined limits 324 and 328. If the cumulative motion exceeds the preset limit 330 the controller generates a signal that may be sent to a host computer or otherwise communicated to the user 332 and then the controller proceeds 334 to complete the monitor mode 336. If the cumulative motion does not exceed the preset limit 338 the information is recorded in local memory and the controller completes the monitor mode 336.

Figure 16:
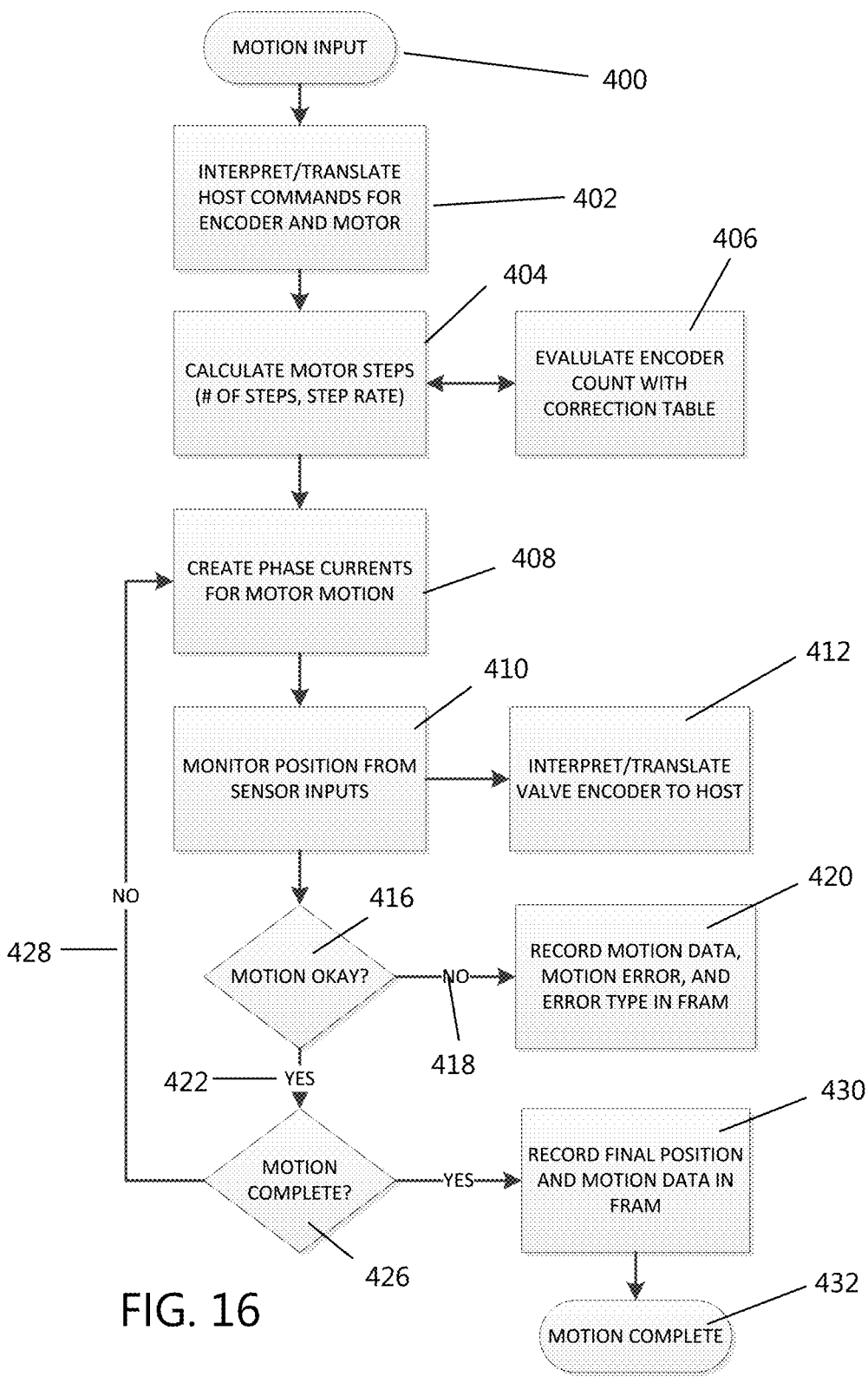
FIG. 16 is a flowchart setting forth an example operation of an incremental encoder of the present invention coupled to a host computer in connection with an incremental motion controller for a valve.

FIG. 16 illustrates an alternative motor motion analysis and control. The motor driver receives a motion input 400 from a host system. The controller interprets the host command and translates the command to the position sensor and motor 402. The controller then calculates the amount of motor movement. The amount of motor movement may be characterized as steps and the number of steps and the rate of steps 404 both of which may be stored in local memory. The signal from the position sensor may be analyzed and compared to a correction table 406 stored in local memory. The motor driver then creates a phase current for motor motion 408 and signals from the position sensors are monitored to determine the amount of movement 410. The signal from the position sensor is translated and then data associated with the translation is sent to the host system 412. The controller then analyzes the signals and determines whether the motion is acceptable 416. If the motion is not acceptable 418 the motion data, motion error and error type is stored in local memory 420 and the controller and the motor driver may create a revised phase current for the motor. If the motion is acceptable 422 the controller determines whether the valve motion is complete 426. If the motion is not complete 428 the motor driver creates a phase current and the motor motion is repeated (loop 428). If the motion is complete then values corresponding to the amount of motion and the final position of the valve are recorded in local memory 430 and the controller indicates the motion is complete 432.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

The invention claimed is:

1. A micro-fluidic multi-position valve assembly for a high pressure liquid chromatograph unit having a host database for digitally storing valve information, a host controller, and a host processor for processing commands from the host controller, the valve assembly comprising:

a multi-position valve having a valve housing, the multi-position valve being movable about a valve axis;

an actuator assembly having an actuator for movably actuating the multi-position valve about the valve axis;

an encoder for determining positions of the multi-position valve about the valve axis and generating a signal responsive to the respective positions and indicative of local valve position data corresponding to a position resolution of the encoder;

a local digital memory unit for recording valve information including the local valve position data associated with the encoder signal; and a local controller communicatively coupled to the actuator, the encoder, the local digital memory unit, and the host controller, wherein the local controller is adapted to translate the local valve position data to host valve position data corresponding to position resolution compatible with the valve information stored at the host database and processed by the host processor, wherein the local valve position data is otherwise incompatible with the valve information stored at the host database and processed by the host processor.

2. The micro-fluidic multi-position valve assembly as in claim 1 wherein the valve housing is releasably engageable with the actuator assembly.

3. The micro-fluidic multi-position valve assembly as in claim 2 wherein the local digital memory unit is connected to the valve housing so as to be removable from the valve assembly with the valve housing.

4. The micro-fluidic multi-position valve assembly as in claim 3 wherein the local controller is connected to the valve housing so as to be removable from the valve assembly with the valve housing.

5. The micro-fluidic multi-position valve assembly as in claim 3, including a second local digital memory unit connected to the actuator assembly so as to remain with the valve assembly when the valve housing is disengaged from the actuator assembly.

6. The micro-fluidic multi-position valve assembly as in claim 1 wherein the encoder is supported by the actuator assembly.

7. The micro-fluidic multi-position valve assembly as in claim 1 wherein the local digital memory unit includes non-volatile FRAM.

8. The micro-fluidic multi-position valve assembly as in claim 1 wherein the valve information includes cumulative valve movement data, failed valve movement data, optimal port location data, valve maintenance data, encoder type data, valve type data, and valve identification data.

9. The micro-fluidic multi-position valve assembly as in claim 1, Wherein the local valve position data is based upon a local position resolution generated by the encoder in the encoder signal, and wherein the host controller does not process the local position resolution.

10. A method for evaluating a micro-fluidic multi-position valve assembly for a high-pressure liquid chromatography unit having a host database for digitally storing valve information, a host controller, and a host processor for processing commands from the host controller, the method comprising:

(a) initializing a multi-position valve of the valve assembly, wherein the multi-position valve is movable about a valve axis;

(b) controlling movement of the multi-position valve about the valve axis;

(c) obtaining local valve position data from a position sensor corresponding to positions of the multi-position valve about the valve axis;

(d) translating the local valve position data to host valve position data compatible with the valve information stored at the host database and processed by the host processor, wherein the local valve position data is otherwise incompatible with the valve information stored at the host database and processed by the host processor.

11. The method as in claim 10 wherein the local valve position data includes at least one of absolute valve position data, cumulative valve movement data, failed valve movement data, optimal port location data, valve maintenance data, encoder type data, valve type data, and valve identification data.

12. The method as in claim 11, including communicating the translated local valve position data to the host controller.

13. The method as in claim 12, including comparing the translated local valve position data to pre-defined limits.

14. The method as in claim 10, including storing the local valve position data in a local digital memory that is removable from the valve assembly along with the multi-position valve.

15. The method as in claim 14 wherein initializing the multi-position valve includes interrogating the local digital memory unit for the local valve position data.

16. The method as in claim 10 wherein the position sensor includes an encoder.

* * * * *